US010668676B2

(12) United States Patent
Nuñez et al.

(10) Patent No.: US 10,668,676 B2
(45) Date of Patent: Jun. 2, 2020

(54) OPHTHALMIC DEVICES

(71) Applicant: Bausch & Lomb Incorporated, Rochester, NY (US)

(72) Inventors: Ivan M. Nuñez, Penfield, NY (US); Lynn Coullard, Williamson, NY (US); Daniel J. Hook, Fairport, NY (US); Robert B. Steffen, Naples, FL (US); Daniel M. Ammon, Webster, NY (US); Jennifer M. Hunt, Lake Grove, NY (US); Analuz Mark, Spencerport, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 183 days.

(21) Appl. No.: 16/100,732

(22) Filed: Aug. 10, 2018

(65) Prior Publication Data
US 2020/0047437 A1 Feb. 13, 2020

(51) Int. Cl.
| | |
|---|---|
| G02B 1/04 | (2006.01) |
| B29D 11/00 | (2006.01) |
| C08F 293/00 | (2006.01) |
| C08L 33/12 | (2006.01) |
| B29K 105/00 | (2006.01) |
| C08F 22/28 | (2006.01) |
| C08F 20/12 | (2006.01) |
| C08F 22/26 | (2006.01) |
| C08F 20/14 | (2006.01) |
| B29K 33/00 | (2006.01) |
| C08F 22/10 | (2006.01) |

(52) U.S. Cl.
CPC ........ B29D 11/00038 (2013.01); C08L 33/12 (2013.01); *B29D 11/00067* (2013.01); *B29K 2033/00* (2013.01); *B29K 2033/08* (2013.01); *B29K 2033/12* (2013.01); *B29K 2105/0061* (2013.01); *B29K 2833/12* (2013.01); *B29K 2995/0092* (2013.01); *C08F 20/12* (2013.01); *C08F 20/14* (2013.01); *C08F 22/1006* (2020.02); *C08F 22/26* (2013.01); *C08F 22/28* (2013.01); *C08F 293/005* (2013.01); *G02B 1/043* (2013.01)

(58) Field of Classification Search
None
See application file for complete search history.

(56) References Cited

U.S. PATENT DOCUMENTS

| | | | |
|---|---|---|---|
| 4,889,664 A | | 12/1989 | Kindt-Larsen et al. |
| 7,841,716 B2 | | 11/2010 | McCabe et al. |
| 7,901,073 B2 | | 3/2011 | Nunez et al. |
| 8,043,369 B2 | | 10/2011 | Linhardt et al. |
| 8,053,489 B2 | | 11/2011 | Nunez et al. |
| 8,133,960 B2 | | 3/2012 | Linhardt et al. |
| 8,138,290 B2 | | 3/2012 | Blackwell et al. |
| 8,252,850 B2 | | 8/2012 | Nunez et al. |
| 8,337,551 B2 | | 12/2012 | Linhardt et al. |
| 8,349,912 B2 | | 1/2013 | Nunez et al. |
| 8,377,464 B2 | | 2/2013 | Linhardt et al. |
| 9,285,508 B2 | | 3/2016 | Nunez et al. |
| 2010/0315588 A1* | | 12/2010 | Nunez ............... A61L 27/52 351/159.33 |
| 2010/0317816 A1 | | 12/2010 | Linhardt et al. |
| 2010/0318185 A1* | | 12/2010 | Nunez ............... A61L 29/145 623/5.16 |
| 2020/0049857 A1* | | 2/2020 | Nunez ............... G02B 1/043 |

FOREIGN PATENT DOCUMENTS

| | | | |
|---|---|---|---|
| EP | 2443483 A1 | | 4/2012 |
| WO | PCT/US2018/046219 | | 5/2019 |

\* cited by examiner

*Primary Examiner* — Richard A Huhn
(74) *Attorney, Agent, or Firm* — Ryan, Mason & Lewis, LLP

(57) ABSTRACT

An ophthalmic device is disclosed that is a polymerization product of a monomeric mixture comprising: (a) a major amount of one or more non-silicone-containing hydrophilic monomers; (b) a crosslinking agent mixture comprising (i) one or more first crosslinking agents containing at least two ethylenically unsaturated reactive end groups, wherein the at least two ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group, and (c) one or more hydrophilic polymers or copolymers comprising one or more hydrophilic units and a thio carbonyl thio fragment of a reversible addition fragmentation chain transfer ("RAFT") agent wherein the ophthalmic device has an equilibrium water content of at least about 45 weight percent.

23 Claims, No Drawings

OPHTHALMIC DEVICES

BACKGROUND

The present invention generally relates to ophthalmic devices such as contact lenses.

Ophthalmic devices such as contact lenses are made of various polymeric materials, including rigid gas permeable materials, soft elastomeric materials, and soft hydrogel materials. The majority of contact lenses sold today are made of soft hydrogel materials. Hydrogels are a crosslinked polymeric system that absorb and retain water, typically 10 to 80 percent by weight, and especially 20 to 70 percent water. Hydrogel lenses are commonly prepared by polymerizing a lens-forming monomer mixture including at least one hydrophilic monomer, such as 2-hydroxyethyl methacrylate, N,N-dimethylacrylamide, N-vinyl-2-pyrrolidone, glycerol methacrylate, and methacrylic acid. In the case of silicone hydrogel lenses, a silicone-containing monomer is copolymerized with the hydrophilic monomers. Regardless of their water content, both hydrogel and non-hydrogel siloxy and/or fluorinated contact lenses tend to have relatively hydrophobic, non-wettable surfaces.

In the field of ophthalmic devices such as contact lenses, various physical and chemical properties such as, for example, oxygen permeability, wettability, material strength and stability are but a few of the factors that must be carefully balanced in order to provide a useable contact lens. For example, since the cornea receives its oxygen supply from contact with the atmosphere, oxygen permeability is an important characteristic for certain contact lens material. Wettability also is important in that, if the lens is not sufficiently wettable, it does not remain lubricated and therefore cannot be worn comfortably in the eye. Accordingly, the optimum contact lens would have at least both excellent oxygen permeability and excellent tear fluid wettability.

It is known that increasing the hydrophilicity of a contact lens surface improves the wettability of the contact lenses. This, in turn, is associated with improved wear comfort of the lens. Additionally, the surface of the lens can affect the overall susceptibility of the lens to deposition of proteins and lipids from the tear fluid during lens wear. Accumulated deposits can cause eye discomfort or even inflammation. In the case of extended wear lenses, i.e., a lens used without daily removal before sleep, the surface is especially important, since extended wear lenses must be designed for high standards of comfort and biocompatibility over an extended period of time. Accordingly, new formulations that have the potential to yield improved surface qualities are still desirable.

Thus, it would be desirable to provide improved ophthalmic devices such as contact lenses that exhibit suitable physical and chemical properties, e.g., oxygen permeability, lubriciousness and wettability, for prolonged contact with the body while also being biocompatible. It would be further desirable to provide improved ophthalmic devices that are easy to manufacture in a simple, cost effective manner.

SUMMARY

In accordance with one embodiment of the present invention, an ophthalmic device is provided which is a polymerization product of a monomeric mixture comprising: (a) a major amount of one or more non-silicone-containing hydrophilic monomers; (b) a crosslinking agent mixture comprising (i) one or more first crosslinking agents containing at least two ethylenically unsaturated reactive end groups, wherein the at least two ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group, and (c) one or more hydrophilic polymers or copolymers comprising one or more hydrophilic units and a thio carbonyl thio fragment of a reversible addition fragmentation chain transfer ("RAFT") agent wherein the ophthalmic device has an equilibrium water content of at least about 45 weight percent.

In accordance with a second embodiment of the present invention, a method is provided for making an ophthalmic device which comprises (a) providing a monomer mixture comprising (i) a major amount of one or more non-silicone-containing hydrophilic monomers; (ii) a crosslinking agent mixture comprising (1) one or more first crosslinking agents containing at least two ethylenically unsaturated reactive end groups, wherein the at least two ethylenically unsaturated reactive end groups are (meth)acrylate-containing reactive end groups and (2) one or more second crosslinking agents containing at least two ethylenically unsaturated reactive end groups wherein at least one of the ethylenically unsaturated reactive end groups is a non-(meth)acrylate reactive end group, and (iii) one or more hydrophilic polymers or copolymers comprising one or more hydrophilic units and a thio carbonyl thio fragment of a RAFT agent; (b) subjecting the monomer mixture to polymerizing conditions to provide a polymerized device, and (c) hydrating the polymerized device, wherein the ophthalmic device has an equilibrium water content of at least about 45 weight percent.

The ophthalmic devices of the present invention advantageously exhibit suitable physical and chemical properties, e.g., oxygen permeability, lubriciousness and wettability, for prolonged contact with the body by polymerizing a monomeric mixture comprising: (a) a major amount of one or more first non-silicone-containing hydrophilic monomers; (b) one or more first crosslinking agents containing at least two ethylenically unsaturated reactive end groups, wherein the at least two ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group, and (c) one or more hydrophilic polymers or copolymers comprising one or more hydrophilic units and a thio carbonyl thio fragment of a RAFT agent wherein the ophthalmic device has an equilibrium water content of at least about 45 weight percent. In addition, the ophthalmic devices of the present invention advantageously exhibit improved dimensional stability, lower extractables, and improved tear resistance and modulus.

DETAILED DESCRIPTION

The illustrative embodiments described herein are directed to ophthalmic devices. Although the illustrative embodiments are applicable to a variety of ophthalmic devices, one particular illustrative embodiment is especially useful and advantageous for contact lenses. As used herein, the terms "opthalmic device" and "lens" refer to devices that reside in or on the eye. These devices can provide optical correction, wound care, drug delivery, diagnostic functionality or cosmetic enhancement or any combination of these properties. Representative examples of such devices include, but are not limited to, soft contact lenses, e.g., soft, hydrogel lenses, soft, non-hydrogel lenses and the like, intraocular lenses, overlay lenses, ocular inserts, optical inserts, bandage lenses and therapeutic lenses and the like. As is understood by one skilled in the art, a lens is considered to be "soft" if it can be folded back upon itself without breaking. The ophthalmic devices such as contact lenses of the illustrative embodiments can be spherical, toric, bifocal, may contain cosmetic tints, opaque cosmetic patterns, combinations thereof and the like.

In one illustrative embodiment, an ophthalmic device will have an equilibrium water content of at least about 45 weight percent. In another illustrative embodiment, an ophthalmic device will have an equilibrium water content of at least about 50 weight percent. In another illustrative embodiment, an ophthalmic device will have an equilibrium water content of at least about 60 weight percent. In another illustrative embodiment, an ophthalmic device will have an equilibrium water content of from about 50 weight percent to about 65 weight percent. In another illustrative embodiment, an ophthalmic device will have an equilibrium water content of from about 55 weight percent to about 65 weight percent. In one illustrative embodiment, an ophthalmic device will have a captive bubble contact angle of from about 30° to about 70°.

In general, the ophthalmic devices are a polymerization product of a monomeric mixture comprising: (a) a major amount of one or more first non-silicone-containing hydrophilic monomers; (b) a crosslinking agent mixture comprising (i) one or more first crosslinking agents containing at least two ethylenically unsaturated reactive end groups, wherein the at least two ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups wherein at least one of the reactive end groups is a non-(meth)acrylate reactive end group, and (c) one or more hydrophilic polymers or copolymers comprising one or more hydrophilic units and a thio carbonyl thio fragment of a RAFT agent, wherein the ophthalmic device has an equilibrium water content of at least about 45 weight percent. As one skilled in the art will readily appreciate, the crosslinking agent mixture containing one or more first crosslinking agents containing at least two ethylenically unsaturated reactive end groups, wherein the at least two ethylenically unsaturated reactive end groups are (meth)acrylate-containing reactive end groups and one or more second crosslinking agents containing at least two ethylenically unsaturated reactive end groups wherein at least one of the ethylenically unsaturated reactive end groups wherein at least one of the reactive end groups is a non-(meth)acrylate reactive end group, and the one or more hydrophilic polymers or copolymers comprising one or more hydrophilic units and a thio carbonyl thio fragment of a RAFT agent are mutually exclusive of each other. In one illustrative embodiment, the monomeric mixture contains no silicone-containing monomer.

As used herein, the term "(meth)" denotes an optional methyl substituent. Thus, terms such as "(meth)acrylate" denotes either methacrylate or acrylate, and "(meth)acrylamide" denotes either methacrylamide or acrylamide.

Suitable non-silicone-containing hydrophilic monomers include amides, cyclic lactams, hydroxyl-containing (meth)acrylates, poly(alkene glycols) functionalized with polymerizable groups and the like and mixtures thereof. Representative examples of amides include alkylamides such as N,N-dimethylacrylamide, N,N-dimethylmethacrylamide and the like and mixtures thereof. Representative examples of cyclic lactams include N-vinyl-2-pyrrolidone, N-vinyl caprolactam, N-vinyl-2-piperidone and the like and mixtures thereof. Representative examples of hydroxyl-containing (meth)acrylates include 2-hydroxyethyl methacrylate (HEMA), glycerol methacrylate and the like and mixtures thereof. Representative examples of functionalized poly(alkene glycols) include poly(diethylene glycols) of varying chain length containing monomethacrylate or dimethacrylate end caps. In one embodiment, the poly(alkene glycol) polymer contains at least two alkene glycol monomeric units. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art. Mixtures of the foregoing non-silicone-containing hydrophilic monomers can also be used in the monomeric mixtures herein.

In one illustrative embodiment, a monomeric mixture will include a major amount of one or more first non-silicone-containing hydrophilic monomers which are one or more hydroxyl-containing (meth)acrylates. In another illustrative embodiment, a monomeric mixture will include a major amount of one or more first non-silicone-containing hydrophilic monomers which are 2-hydroxyethyl methacrylate.

In general, the one or more non-silicone-containing hydrophilic monomers are present in the monomeric mixture in a major amount, e.g., an amount of at least about 70 weight percent or an amount of at least about 70 weight percent and up to about 95 weight percent or an amount of at least about 80 weight percent, or an amount of at least about 80 weight percent and up to about 95 weight percent based on the total weight of the monomeric mixture.

The monomeric mixture further includes a crosslinking agent mixture comprising (i) one or more first crosslinking agents containing at least two ethylenically unsaturated reactive end groups, wherein the ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group. In one illustrative embodiment, useful one or more first crosslinking agents containing at least two ethylenically unsaturated reactive end groups, wherein the ethylenically unsaturated reactive end groups are (meth)acrylate-containing reactive end groups include one or more di-, tri- or tetra(meth)acrylate-containing crosslinking agents.

In one illustrative embodiment, useful one or more di-, tri- or tetra(meth)acrylate-containing crosslinking agents include alkanepolyol di-, tri- or tetra(meth)acrylate-containing crosslinking agents such as, for example, one or more alkylene glycol di(meth)acrylate crosslinking agents, one or more alkylene glycol tri(meth)acrylate crosslinking agents, one or more alkylene glycol tetra(meth)acrylate crosslinking agents, one or more alkanediol di(meth)acrylate crosslinking agents, alkanediol tri(meth)acrylate crosslinking agents, alkanediol tetra(meth)acrylate crosslinking agents, agents, one or more alkanetriol di(meth)acrylate crosslinking agents, alkanetriol tri(meth)acrylate crosslinking agents, alkanetriol tetra(meth)acrylate crosslinking agents, agents, one or more alkanetetraol di(meth)acrylate crosslinking agents, alkanetetraol tri(meth)acrylate crosslinking agents, alkanetetraol tetra(meth)acrylate crosslinking agents and the like and mixtures thereof.

In one embodiment, one or more alkylene glycol di(meth) acrylate crosslinking agents include tetraethylene glycol dimethacrylate, ethylene glycol di(meth)acrylates having up to about 10 ethylene glycol repeating units, butyleneglycol di(meth)acrylate and the like. In one embodiment, one or more alkanediol di(meth)acrylate crosslinking agents include butanediol di(meth)acrylate crosslinking agents, hexanediol di(meth)acrylate and the like. In one embodiment, one or more alkanetriol tri(meth)acrylate crosslinking agents are trimethylol propane trimethacrylate crosslinking agents. In one embodiment, one or more alkanetetraol tetra(meth)acrylate crosslinking agents are pentaerythritol tetramethacrylate crosslinking agents.

In one illustrative embodiment, useful one or more second crosslinking agents containing at least two ethylenically unsaturated reactive end groups wherein at least one of the ethylenically unsaturated reactive end groups is a non-(meth)acrylate reactive end group include one or more di-, tri- or tetracarbamate-containing crosslinking agents, one or more di-, tri- or tetracarbonate-containing crosslinking agents, one or more isocyanurate-containing crosslinking agents and the like and mixtures thereof.

Representative examples of one or more di-, tri- or tetracarbamate-containing crosslinking agents include one or more di(N-vinylcarbamate)-containing crosslinking agents, one or more di(N-allylcarbamate)-containing crosslinking agents, one or more di(O-vinylcarbamate)-containing crosslinking agents, one or more di(O-allylcarbamate)-containing crosslinking agents, one or more tri(N-vinylcarbamate)-containing crosslinking agents, one or more tri(N-allylcarbamate)-containing crosslinking agents, one or more tri(O-vinylcarbamate)-containing crosslinking agents, one or more tri(O-allylcarbamate)-containing crosslinking agents, one or more tetra(N-vinylcarbamate)-containing crosslinking agents, one or more tetra (N-allylcarbamate)-containing crosslinking agents, one or more tetra (O-vinylcarbamate)-containing crosslinking agents, one or more tetra(0-allyl carbamate)-containing crosslinking agents, and the like and mixtures thereof.

Representative examples of one or more di-, tri- or tetracarbonate-containing crosslinking agents include a di(0-vinylcarbonate)-containing crosslinking agent, a di(0-allyl-carbonate)-containing crosslinking agent, a tri(0-vinylcarbonate)-containing crosslinking agent, a tri(0-allylcarbonate)-containing crosslinking agent, a tetra(0-vinylcarbonate)-containing crosslinking agent, a tetra(0-allylcarbonate)-containing crosslinking agent, and the like and mixtures thereof.

Representative examples of one or more isocyanurate-containing crosslinking agents include one or more diallyl isocyanurate, triallyl isocyanurate, divinyl isocyanurate, trivinyl isocyanurate, and the like and mixtures thereof.

In one embodiment, one or more di-carbamate-containing crosslinking agents include bis (N-vinyl carbamates) having the following structure:

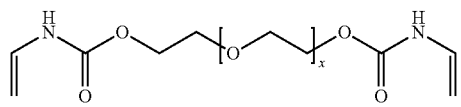

wherein x is from 0 to 10.

In one embodiment, one or more di-carbamate-containing crosslinking agents include bis (O-vinyl carbamates) having the following structure:

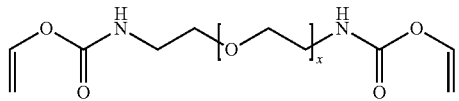

wherein x is from 0 to 10.

In one embodiment, one or more di-carbamate-containing crosslinking agents include diethylene glycol bis(N-vinylcarbamate), diethylene glycol bis(O-allylcarbamate), and the like and mixtures thereof.

In one embodiment, the one or more second crosslinking agents are selected are from the group consisting of diethylene glycol bis(N-vinylcarbamate), diethylene glycol bis (N-allylcarbamate), diethylene glycol bis(O-vinylcarbamate), diethylene glycol bis(O-allylcarbamate), and mixtures thereof, 1,4-butanediol bis(N-vinylcarbamate), ethylene glycol bis(O-vinyl carbonate), diethylene glycol bis(O-vinyl carbonate), 1,4-butanediol bis(O-vinyl carbonate) and mixtures thereof.

In one embodiment, the one or more second crosslinking agents containing at least two ethylenically unsaturated reactive end groups include at least one allyl-containing reactive end group and at least one (meth)acrylate-containing reactive end group. In one embodiment, the one or more second crosslinking agents include allyl methacrylate.

In general, the one or more first and/or second crosslinking agents are present in the monomeric mixture in an ophthalmic device-forming amount. In one embodiment, the one or more first crosslinking agents are present in the monomeric mixture in an amount of about 0.1 to about 2.0 weight percent, based on the total weight of the monomer mixture, and the second crosslinking agent is present in the monomer mixture in an amount of about 0.05 to about 2.0 weight percent, based on the total weight of the monomer mixture.

The monomeric mixture further includes one or more hydrophilic polymers or copolymers comprising one or more hydrophilic units and a thio carbonyl thio fragment of a RAFT agent. The term "hydrophilic polymers or copolymers" as used herein shall be understood to mean a hydrophilic polymer or copolymer containing polar or charged functional groups rendering it water-soluble. Hydrophilic polymers or copolymers comprising one or more hydrophilic units and a thio carbonyl thio fragment of a RAFT agent are prepared via RAFT polymerization, i.e., monomers are polymerized via a RAFT mechanism to form the hydrophilic polymer or copolymers, e.g., a block or random copolymer in which the molecular weight of each of the blocks and the entire polymer can be precisely controlled. Thus, RAFT polymerization is a radical polymerization technique that enables polymers to be prepared having a well-defined molecular architecture and low polydispersity.

The RAFT agents suitable for use herein are based upon thio carbonyl thio chemistry which is well known to those of ordinary skill in the art. The RAFT agent can be, for example, a xanthate-containing compound, trithiocarbonate-containing compound, dithiocarbamate-containing compound or dithio ester-containing compound, wherein each compound contains a thiocarbonyl thio group. One class of RAFT agents that can be used herein is of the general formula:

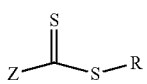

wherein Z is a substituted oxygen (e.g., xanthates (—O—R)), a substituted nitrogen (e.g., dithiocarbamates (—NRR)), a substituted sulfur (e.g., trithiocarbonates (—S—R)), a substituted or unsubstituted $C_1$-$C_{20}$ alkyl or $C_3$-$C_{25}$ unsaturated, or partially or fully saturated ring (e.g., dithioesters (—R)) or a carboxylic acid-containing group; and R is independently a straight or branched, substituted or unsubstituted $C_1$-$C_{30}$ alkyl group, a substituted or unsubstituted $C_3$-$C_{30}$ cycloalkyl group, a substituted or unsubstituted $C_3$-$C_{30}$ cycloalkylalkyl group, a substituted or unsubstituted $C_3$-$C_{30}$ cycloalkenyl group, a substituted or unsubstituted $C_5$-$C_{30}$ aryl group, a substituted or unsubstituted $C_5$-$C_{30}$ arylalkyl group, a $C_1$-$C_{20}$ ester group; an ether or polyether-containing group; an alkyl- or arylamide group; an alkyl- or arylamine group; a substituted or unsubstituted $C_5$-$C_{30}$ heteroaryl group; a substituted or unsubstituted $C_3$-$C_{30}$ heterocyclic ring; a substituted or unsubstituted $C_4$-$C_{30}$ heterocycloalkyl group; a substituted or unsubstituted $C_6$-$C_{30}$ heteroarylalkyl group; and combinations thereof.

Representative examples of alkyl groups for use herein include, by way of example, a straight or branched alkyl chain radical containing carbon and hydrogen atoms of from 1 to about 30 carbon atoms and preferably from 1 to about 12 carbon atoms with or without unsaturation, to the rest of the molecule, e.g., methyl, ethyl, n-propyl, 1-methylethyl (isopropyl), n-butyl, n-pentyl, methylene, ethylene, etc., and the like.

Representative examples of cycloalkyl groups for use herein include, by way of example, a substituted or unsubstituted non-aromatic mono or multicyclic ring system of about 3 to about 30 carbon atoms and preferably from 3 to about 6 carbon atoms such as, for example, cyclopropyl, cyclobutyl, cyclopentyl, cyclohexyl, perhydronapthhyl, adamantyl and norbornyl groups, bridged cyclic groups or sprirobicyclic groups, e.g., spiro-(4, 4)-non-2-yl and the like, optionally containing one or more heteroatoms, e.g., O and N, and the like.

Representative examples of cycloalkylalkyl groups for use herein include, by way of example, a substituted or unsubstituted cyclic ring-containing radical containing from about 3 to about 30 carbon atoms and preferably from 3 to about 6 carbon atoms directly attached to the alkyl group which are then attached to the main structure of the monomer at any carbon from the alkyl group that results in the creation of a stable structure such as, for example, cyclopropylmethyl, cyclobutylethyl, cyclopentylethyl and the like, wherein the cyclic ring can optionally contain one or more heteroatoms, e.g., O and N, and the like.

Representative examples of cycloalkenyl groups for use herein include, by way of example, a substituted or unsubstituted cyclic ring-containing radical containing from about 3 to about 30 carbon atoms and preferably from 3 to about 6 carbon atoms with at least one carbon-carbon double bond such as, for example, cyclopropenyl, cyclobutenyl, cyclopentenyl and the like, wherein the cyclic ring can optionally contain one or more heteroatoms, e.g., O and N, and the like.

Representative examples of aryl groups for use herein include, by way of example, a substituted or unsubstituted monoaromatic or polyaromatic radical containing from about 5 to about 30 carbon atoms such as, for example, phenyl, naphthyl, tetrahydronapthyl, indenyl, biphenyl and the like, optionally containing one or more heteroatoms, e.g., O and N, and the like.

Representative examples of arylalkyl groups for use herein include, by way of example, a substituted or unsubstituted aryl group as defined herein directly bonded to an alkyl group as defined herein, e.g., —$CH_2C_6H_5$, —$C_2H_5C_6H_5$ and the like, wherein the aryl group can optionally contain one or more heteroatoms, e.g., O and N, and the like.

Representative examples of ester groups for use herein include, by way of example, a carboxylic acid ester having one to 20 carbon atoms and the like.

Representative examples of ether or polyether containing groups for use herein include, by way of example, an alkyl ether, cycloalkyl ether, cycloalkylalkyl ether, cycloalkenyl ether, aryl ether, arylalkyl ether wherein the alkyl, cycloalkyl, cycloalkylalkyl, cycloalkenyl, aryl, and arylalkyl groups are as defined herein. Exemplary ether or polyether-containing groups include, by way of example, alkylene oxides, poly(alkylene oxide)s such as ethylene oxide, propylene oxide, butylene oxide, poly(ethylene oxide)s, poly(ethylene glycol)s, poly(propylene oxide)s, poly(butylene oxide)s and mixtures or copolymers thereof, an ether or polyether group of the general formula —$(R^2OR^3)_t$, wherein $R^2$ is a bond, a substituted or unsubstituted alkyl, cycloalkyl or aryl group as defined herein and $R^3$ is a substituted or unsubstituted alkyl, cycloalkyl or aryl group as defined herein and t is at least 1, e.g., —$CH_2CH_2OC_6H_5$ and $CH_2$—$CH_2$—$CH_2$—O—$CH_2$—$(CF_2)_z$—H where z is 1 to 6, —$CH_2CH_2OC_2H_5$, and the like.

Representative examples of alkyl or arylamide groups for use herein include, by way of example, an amide of the general formula —$R^4C(O)NR^5R^6$ wherein $R^4$, $R^5$ and $R^6$ are independently $C_1$-$C_{30}$ hydrocarbons, e.g., $R^4$ can be alkylene groups, arylene groups, cycloalkylene groups and $R^5$ and $R^6$ can be alkyl groups, aryl groups, and cycloalkyl groups as defined herein and the like.

Representative examples of alkyl or arylamine groups for use herein include, by way of example, an amine of the general formula —$R^7NR^8R^9$ wherein $R^7$ is a $C_2$-$C_{30}$ alkylene, arylene, or cycloalkylene and $R^8$ and $R^9$ are independently $C_1$-$C_{30}$ hydrocarbons such as, for example, alkyl groups, aryl groups, or cycloalkyl groups as defined herein.

Representative examples of heterocyclic ring groups for use herein include, by way of example, a substituted or unsubstituted stable 3 to about 30 membered ring radical, containing carbon atoms and from one to five heteroatoms, e.g., nitrogen, phosphorus, oxygen, sulfur and mixtures thereof. Suitable heterocyclic ring radicals for use herein may be a monocyclic, bicyclic or tricyclic ring system, which may include fused, bridged or spiro ring systems, and the nitrogen, phosphorus, carbon, oxygen or sulfur atoms in the heterocyclic ring radical may be optionally oxidized to various oxidation states. In addition, the nitrogen atom may be optionally quaternized; and the ring radical may be partially or fully saturated (i.e., heteroaromatic or heteroaryl aromatic). Examples of such heterocyclic ring radicals include, but are not limited to, azetidinyl, acridinyl, benzodioxolyl, benzodioxanyl, benzofurnyl, carbazolyl, cinnolinyl, di oxolanyl, indolizinyl, naphthyridinyl, perhydroazepinyl, phenazinyl, phenothiazinyl, phenoxazinyl, phthalazinyl, pyridyl, pteridinyl, purinyl, quinazolinyl, quinoxalinyl, quinolinyl, isoquinolinyl, tetrazoyl, imidazolyl, tetrahydroquinolinyl, tetrahydroisoquinolinyl, piperidinyl, piperazinyl, 2-oxopiperazinyl, 2-oxopiperidinyl, 2-oxopyrrolidinyl, 2-oxoazepinyl, azepinyl, pyrrolyl, 4-piperidonyl, pyrrolidinyl, pyrazinyl, pyrimidinyl, pyridazinyl, oxazolyl, oxazolinyl, oxazolidinyl, triazolyl, indanyl, isoxazolyl, iso-oxazolidinyl, morpholinyl, thiazolyl, thiazolinyl, thiazolidinyl, isothiazolyl, quinuclidinyl, isothiazolidinyl, indolyl, isoindolyl, indolinyl, isoindolinyl, octahydroindolyl, octahydroisoindolyl, quinolyl, isoquinolyl, decahydroisoquinolyl, benzimidazolyl, thiadiazolyl, benzopyranyl, benzothiazolyl, benzooxazolyl, furyl, tetrahydrofurtyl, tetrahydropyranyl, thienyl, benzothienyl, thiamorpholinyl, thiamorpholinyl sulfoxide, thiamorpholinyl sulfone, dioxaphospholanyl, oxadiazolyl, chromanyl, isochromanyl and the like and mixtures thereof.

Representative examples of heteroaryl groups for use herein include, by way of example, a substituted or unsubstituted heterocyclic ring radical as defined herein. The heteroaryl ring radical may be attached to the main structure at any heteroatom or carbon atom that results in the creation of a stable structure.

Representative examples of heteroarylalkyl groups for use herein include, by way of example, a substituted or unsubstituted heteroaryl ring radical as defined herein directly bonded to an alkyl group as defined herein. The heteroarylalkyl radical may be attached to the main structure at any carbon atom from the alkyl group that results in the creation of a stable structure.

Representative examples of heterocyclic groups for use herein include, by way of example, a substituted or unsubstituted heterocylic ring radical as defined herein. The heterocyclic ring radical may be attached to the main structure at any heteroatom or carbon atom that results in the creation of a stable structure.

Representative examples of heterocycloalkyl groups for use herein include, by way of example, a substituted or unsubstituted heterocylic ring radical as defined herein directly bonded to an alkyl group as defined herein. The heterocycloalkyl radical may be attached to the main structure at any carbon atom in the alkyl group that results in the creation of a stable structure.

The substituents in the 'substituted oxygen', 'substituted nitrogen', 'substituted sulfur', 'substituted alkyl', 'substituted alkylene, 'substituted cycloalkyl', 'substituted cycloalkylalkyl', 'substituted cycloalkenyl', 'substituted arylalkyl', 'substituted aryl', 'substituted heterocyclic ring', 'substituted heteroaryl ring,' 'substituted heteroarylalkyl', 'substituted heterocycloalkyl ring', 'substituted cyclic ring' may be the same or different and include one or more substituents such as hydrogen, hydroxy, halogen, carboxyl, cyano, nitro, oxo (=O), thio(=S), substituted or unsubstituted alkyl, substituted or unsubstituted alkoxy, substituted or unsubstituted alkenyl, substituted or unsubstituted alkynyl, substituted or unsubstituted aryl, substituted or unsubstituted arylalkyl, substituted or unsubstituted cycloalkyl, substituted or unsubstituted cycloalkenyl, substituted or unsubstituted amino, substituted or unsubstituted aryl, substituted or unsubstituted heteroaryl, substituted heterocycloalkyl ring, substituted or unsubstituted heteroarylalkyl, substituted or unsubstituted heterocyclic ring, and the like.

Representative examples of a carboxylic acid-containing group for use herein include, by way of example, a carboxylic acid group attached to the rest of the molecule via a linking group, e.g., of the general formula —R$^{11}$C(O)OH, wherein R$^H$ is a bond, a substituted or unsubstituted alkylene group, a substituted or unsubstituted cycloalkylene group, a substituted or unsubstituted cycloalkylalkylene group, a substituted or unsubstituted arylene or a substituted or unsubstituted arylalkylene group as defined herein, e.g., —CH(Ar)(C(O)OH), —C(CH$_3$)(C(O)OH), and the like, wherein the carboxylic acid group can be attached to the substituent or attached directly to alkylene group, cycloalkylene group, cycloalkylalkylene group, aryl ene or aryl alkylene group.

Representative examples of RAFT agents for use herein include, but are not limited to, benzyl dodecyl trithiocarbonate, ethyl-2-dodecyl trithiocarbony) proprionate, S-sec propionic acid O-ethyl xanthate, α-ethyl xanthylphenylacetic acid, ethyl α-(o-ethyl xanthyl) proprionate, ethyl α-(ethyl xanthyl) phenyl acetate, ethyl 2-(dodecyl trithiocarbonyl) phenyl acetate, ethyl 2-(dodecyl trithiocarbonyl) propionate, 2-(dodecylthiocarbonylthiol)propanoic acid, and the like and mixtures thereof.

Representative examples of RAFT agents for use herein include, carboxylic acid trithiocarbonates as set forth below:

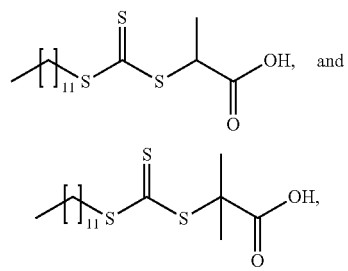

benzyl trithiocarbonates as set forth below:

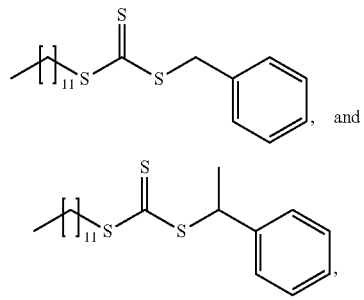

xanthates of the formula:

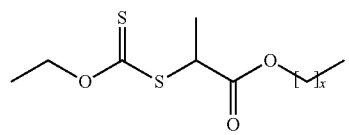

wherein x is from 0 to 23,

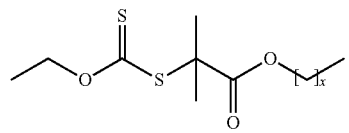

wherein x is from 0 to 23, cyano RAFT agent as follows:

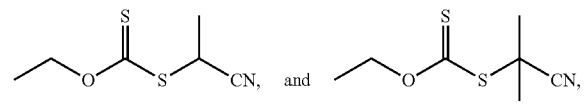

and dithiobenzoates as follows:

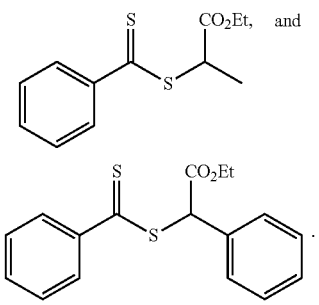

There is no particular limitation on the organic chemistry used to form the RAFT agent and is within the purview of one skilled in the art. Also, the working examples below provide guidance. For example, the RAFT agents can be prepared as exemplified in Schemes below.

SCHEME I

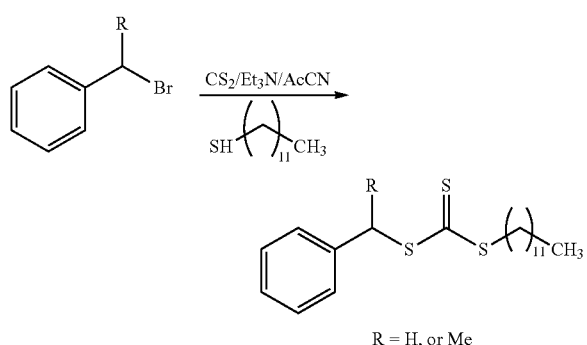

R = H, or Me

SCHEME II

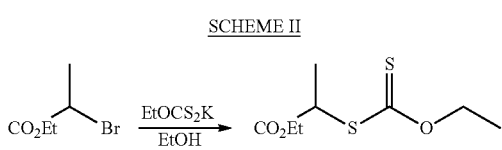

SCHEME III

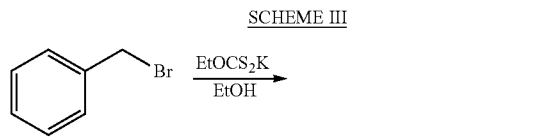

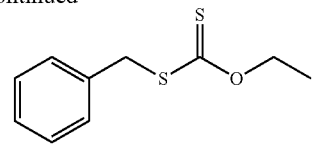

SCHEME IV

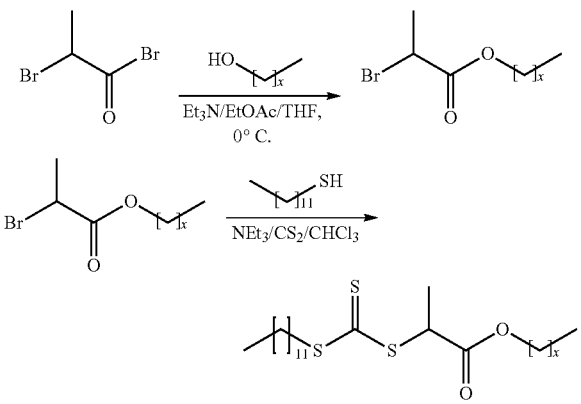

SCHEME V

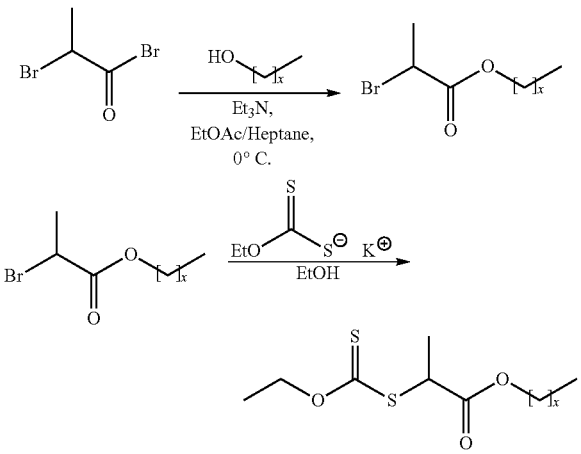

In addition to the thio carbonyl thio fragment of a RAFT agent, the hydrophilic polymers or copolymers described herein also contain one or more hydrophilic units. In general, the hydrophilic unit(s) is derived from at least one hydrophilic monomer. Suitable hydrophilic monomer include, by way of example, acrylamides such as N,N-dimethylacrylamide, N,N-dimethylmethacrylamide, and the like; acetamides such as N-vinyl-N-methyl acetamide, N-vinyl acetamide and the like; formamides such as N-vinyl-N-methyl formamide, N-vinyl formamide, and the like; cyclic lactams such as N-vinyl-2-pyrrolidone and the like; (meth) acrylated alcohols such as 2-hydroxyethyl methacrylate, 2-hydroxyethyl acrylate and the like; (meth)acrylated poly (ethyleneglycol)s and the like; ethylenically unsaturated carboxylic acids such as methacrylic acid, acrylic acid and the like and mixtures thereof.

In one embodiment, the hydrophilic polymers or copolymers containing a thio carbonyl thio fragment of a RAFT agent can also include one or more hydrophilic units derived from an ethylenically unsaturated polymerizable monomer having ring-opening reactive functionalities. Such monomers may include one or more ring-opening reactive groups such as, for example, azlactone, epoxy, acid anhydrides, and the like. Suitable polymerizable monomer having ring-opening reactive functionalities include, but are not limited to, glycidyl methacrylate (GMA), maleic anhydride, itaconic anhydride and the like and mixtures thereof. The units derived from an ethylenically unsaturated polymerizable monomer having ring-opening reactive functionalities can be copolymerized with a hydrophilic comonomer to form the hydrophilic units in the resulting hydrophilic polymers. Non-limiting examples of comonomers useful to be copolymerized with the ring-opening reactive functionalities of the monomer to form hydrophilic polymers or copolymers used to prepare an ophthalmic device according to the present invention include those mentioned above, with dimethylacrylamide, hydroxyethyl methacrylate (HEMA), and/ or N-vinylpyrrolidone being preferred. Alternatively, the unit derived from the ethylenically unsaturated polymerizable hydrophilic monomers having ring-opening reactive functionalities can be subjected to a ring-opening reaction, e.g., by hydrolyzing with water, and form hydrophilic units in the resulting hydrophilic polymer.

In one embodiment, the hydrophilic polymers or copolymers containing a thio carbonyl thio fragment of a RAFT agent can also include a unit derived from an ethylenically unsaturated polymerizable alkoxylated polymer. Suitable ethylenically unsaturated polymerizable alkoxylated polymers include, by way of example, polymerizable polyethylene glycols having a number average molecular weight of up to, for example, about 2000 such as those with CTFA names PEG-200, PEG-400, PEG-600, PEG-1000, and mixtures thereof. Representative examples include PEG-200 methacrylate, PEG-400 methacrylate, PEG-600 methacrylate, PEG-1000 methacrylate and the like and mixtures thereof.

In one embodiment, the size of the units derived from an ethylenically unsaturated polymerizable alkoxylated polymer can vary widely, e.g., the number of units can range from 0 to about 20 mole % of the total number of units in the polymerization product or from 1 to about 10 mole % of the total number of units in the polymerization product.

The resulting hydrophilic polymers or copolymers can be in the form of homopolymers, block copolymers and random copolymers. In one illustrative embodiment, the one or more hydrophilic polymers or copolymers will have a number average molecular weight of at least about 30 kilo Daltons (kDa), e.g., a number average molecular weight of about 30 kDa to about 125 kDa. In one illustrative embodiment, the one or more hydrophilic polymers or copolymers will have a number average molecular weight of at least about 45 kDa, e.g., a number average molecular weight of about 45 kDa to about 100 kDa. In one illustrative embodiment, the one or more hydrophilic polymers or copolymers will have a number average molecular weight of at least about 60 kDa, e.g., a number average molecular weight of about 60 kDa to about 80 kDa. In general, the number average molecular weight of the one or more hydrophilic polymers or copolymers can be determined by Size Exclusion Chromatography (SEC) (also referred to as Gel Permeation Chromatography (GPC)).

Methods for preparing hydrophilic polymers or copolymers containing a thio carbonyl thio fragment of a RAFT agent as described above are within the purview of one skilled in the art. Representative schemes for preparing the hydrophilic polymers are set forth below in Schemes VI-VIII:

SCHEME VI

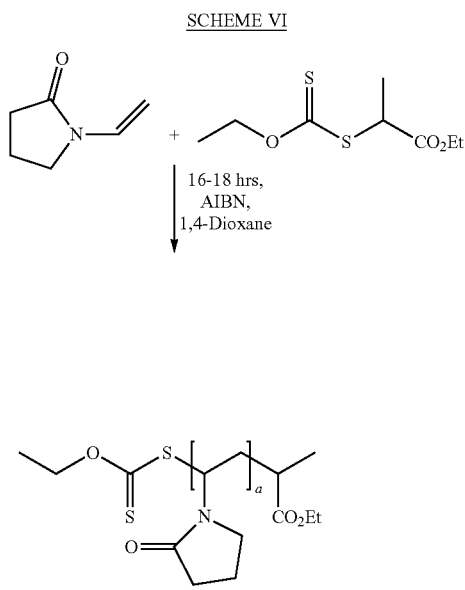

wherein a is from about 10 to about 2,700.

SCHEME VII

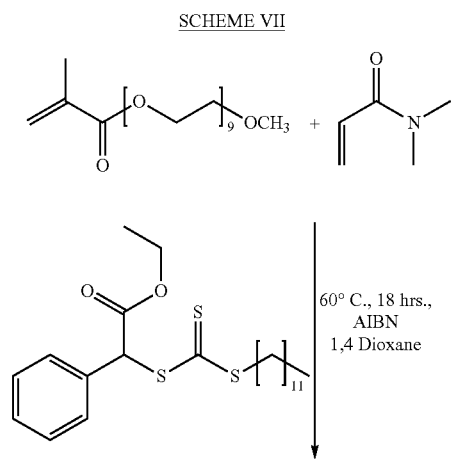

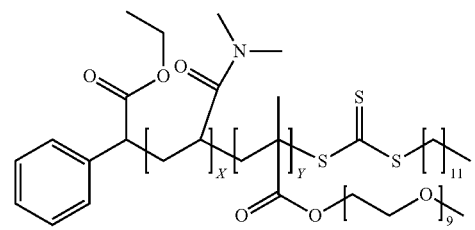

wherein x is from about 15 to about 3000 and y is from about 1 to about 250.

SCHEME VIII

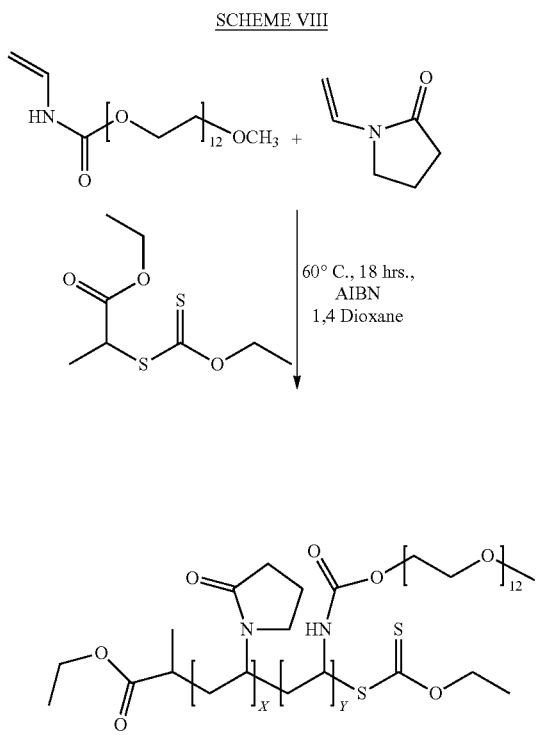

wherein x is from about 12 to about 3000 and y is from about 1 to about 250.

In general, the one or more hydrophilic polymers or copolymers comprising hydrophilic units and a thio carbonyl thio fragment of a RAFT agent are present in the monomeric mixture in an amount of about 0.5 to about 20 weight percent, based on the total weight of the monomer mixture. In one embodiment, the one or more hydrophilic polymers or copolymers comprising hydrophilic units and a thio carbonyl thio fragment of a RAFT agent are present in the monomeric mixture in an amount of about 0.5 to about 8.5 weight percent, based on the total weight of the monomer mixture.

The monomeric mixture may further include one or more hydrophobic monomers. Suitable hydrophobic monomers include ethylenically unsaturated hydrophobic monomers such as, for example, (meth)acrylates-containing hydrophobic monomers, N-alkyl (meth)acrylamides-containing hydrophobic monomers, alkyl vinylcarbonates-containing hydrophobic monomers, alkyl vinylcarbamates-containing hydrophobic monomers, fluoroalkyl (meth)acrylates-containing hydrophobic monomers, N-fluoroalkyl (meth)acrylamides-containing hydrophobic monomers, N-fluoroalkyl vinylcarbonates-containing hydrophobic monomers, N-fluoroalkyl vinyl carbamates-containing hydrophobic monomers, silicone-containing (meth)acrylates-containing hydrophobic monomers, (meth)acrylamides-containing hydrophobic monomers, vinyl carbonates-containing hydrophobic monomers, vinyl carbamates-containing hydrophobic monomers, styrenic-containing hydrophobic monomers, polyoxypropylene (meth)acrylate-containing hydrophobic monomers and the like and mixtures thereof.

In one illustrative embodiment, wherein the one or more hydrophobic monomers is represented by the structure of Formula I:

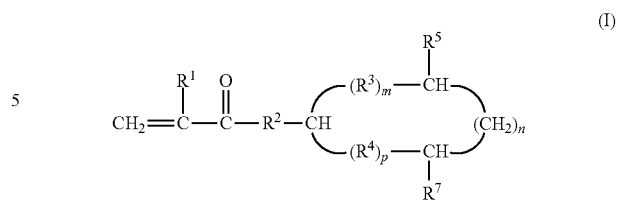

(I)

wherein $R^1$ is methyl or hydrogen; $R^2$ is —O— or —NH—; $R^3$ and $R^4$ are independently a divalent radical selected from the group consisting of —$CH_2$—, —CHOH— and —$CHR^6$—; $R^5$ and $R^6$ are independently a branched $C_3$-$C_8$ alkyl group; $R^7$ is hydrogen or —OH; n is an integer of at least 1, and m and p are independently 0 or an integer of at least 1, provided that the sum of m, p and n is 2, 3, 4 or 5.

Representative examples of one or more hydrophobic monomers (b) represented by the structure of Formula I include, but are not limited to, 4-t-butyl-2-hydroxycyclohexyl methacrylate (TBE); 4-t-butyl-2-hydroxycyclopentyl methacrylate; 4-t-butyl-2-hydroxycyclohexyl methacrylamide (TBA); 6-isopentyl-3-hydroxycyclohexyl methacrylate; 2-isohexyl-5-hydroxycyclopentyl methacryl amide, 4-t-butylcyclohexyl methacrylate, isobornyl methacrylate, adamantly methacrylate, n-butyl methacrylate, n-hexyl methacrylate, lauryl methacrylate, benzyl methacrylate, and the like. In one embodiment, one or more hydrophobic monomers (b) include compounds of formula I wherein $R^3$ is —$CH_2$—, m is 1 or 2, p is 0, and the sum of m and n is 3 or 4.

The one or more hydrophobic monomers will ordinarily be present in the monomeric mixture in an amount ranging from about 0.5 to about 25 or from about 1 to about 10 weight percent, based on the total weight of the monomeric mixture.

In another illustrative embodiment, the monomeric mixture further includes one or more ultraviolet (UV) blockers. In one embodiment, useful UV blockers include one or more compounds of the following formula:

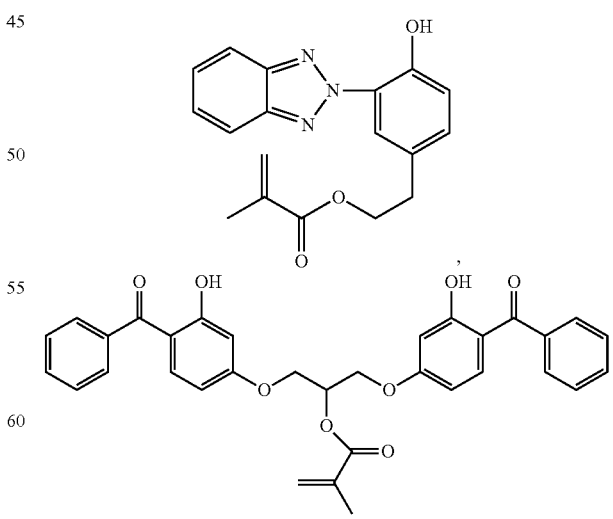

(2-Propenoic acid, 2-methyl, 2-(4-benzoyl-3-hydroxyphenoxy)-1-[(4-benzoyl3-hydroxyphenoxy)methyl ester),

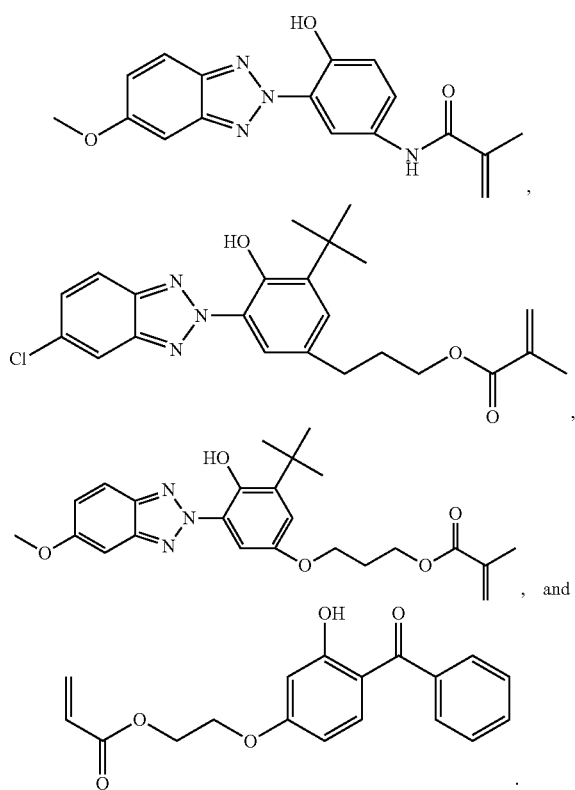

The monomeric mixture may further contain, as necessary and within limits not to impair the purpose and effect of the present invention, various additives such as an antioxidant, coloring agent, wetting agents, toughening agents and the like and other constituents as is well known in the art.

In one embodiment, a suitable wetting agent can be glycerin, propylene glycol, mono or disaccharide, polyethylene glycol, ethoxylated glucose, and combinations thereof. In one embodiment, a suitable wetting agent can be a polymer containing carboxylic acid functionality, such as a polymer containing PAA. Specific coating wetting agents include P(vinylpyrrolidinone (VP)-co-acrylic acid (AA)), P(methylvinylether-alt-maleic acid), P(acrylic acid-graft-ethyleneoxide), P(acrylic acid-co-methacrylic acid), P(acrylamide-co-AA), P(acrylamide-co-AA), P(AA-co-maleic), P(butadiene-maleic acid) and P(N-vinylpyrrolidone-co-vinyl acetate), Polyvinylalcohol.

The ophthalmic devices of the illustrative embodiments, e.g., contact lenses or intraocular lenses, can be prepared by polymerizing the foregoing monomeric mixtures to form a product that can be subsequently formed into the appropriate shape by, for example, lathing, injection molding, compression molding, cutting and the like. For example, in producing contact lenses, the initial mixture may be polymerized in tubes to provide rod-shaped articles, which are then cut into buttons. The buttons may then be lathed into contact lenses.

Alternately, the ophthalmic devices such as contact lenses may be cast directly in molds, e.g., polypropylene molds, from the mixtures, e.g., by spincasting and static casting methods. Spincasting methods are disclosed in U.S. Pat. Nos. 3,408,429 and 3,660,545, and static casting methods are disclosed in U.S. Pat. Nos. 4,113,224, 4,197,266, and 5,271,875. Spincasting methods involve charging the mixtures to be polymerized to a mold, and spinning the mold in a controlled manner while exposing the mixture to a radiation source such as UV light. Static casting methods involve charging the monomeric mixture between two mold sections, one mold section shaped to form the anterior lens surface and the other mold section shaped to form the posterior lens surface, and curing the mixture while retained in the mold assembly to form a lens, for example, by free radical polymerization of the mixture. Examples of free radical reaction techniques to cure the lens material include thermal radiation, infrared radiation, electron beam radiation, gamma radiation, ultraviolet (UV) radiation, and the like; or combinations of such techniques may be used. U.S. Pat. No. 5,271,875 describes a static cast molding method that permits molding of a finished lens in a mold cavity defined by a posterior mold and an anterior mold. As an additional method, U.S. Pat. No. 4,555,732 discloses a process where an excess of a monomeric mixture is cured by spincasting in a mold to form a shaped article having an anterior lens surface and a relatively large thickness, and the posterior surface of the cured spincast article is subsequently lathed to provide a contact lens having the desired thickness and posterior lens surface.

Polymerization may be facilitated by exposing the mixture to heat and/or radiation, such as ultraviolet light, visible light, or high energy radiation. A polymerization initiator may be included in the mixture to facilitate the polymerization step. Representative examples of free radical thermal polymerization initiators include organic peroxides such as acetyl peroxide, lauroyl peroxide, decanoyl peroxide, stearoyl peroxide, benzoyl peroxide, tertiarylbutyl peroxypivalate, peroxydicarbonate, and the like. Representative UV initiators are those known in the art and include benzoin methyl ether, benzoin ethyl ether, Darocure® 1173, 1164, 2273, 1116, 2959, 3331 (EM Industries) and Irgacure® 651 and 184 (Ciba-Geigy), 2,2'Azobis(2-methylpropionitrile) (VAZO 64) and the like. Generally, the initiator will be employed in the monomeric mixture at a concentration of about 0.01 to about 5 percent by weight of the total mixture.

Polymerization is generally performed in a reaction medium, such as, for example, a solution or dispersion using a solvent, e.g., water or an alkanol containing from 1 to 4 carbon atoms such as methanol, ethanol or propan-2-ol. Alternatively, a mixture of any of the above solvents may be used.

Generally, polymerization can be carried out for about 15 minutes to about 72 hours, and under an inert atmosphere of, for example, nitrogen or argon. If desired, the resulting polymerization product can be dried under vacuum, e.g., for about 5 to about 72 hours or left in an aqueous solution prior to use.

Polymerization of the mixtures will yield a polymer, that when hydrated, preferably forms a hydrogel. When producing a hydrogel lens, the mixture may further include at least a diluent that is ultimately replaced with water when the polymerization product is hydrated to form a hydrogel. Generally, the water content of the hydrogel is as described hereinabove, i.e., at least about 45 weight percent, or at least about 50 weight percent. The amount of diluent used should be less than about 50 weight percent and in most cases, the diluent content will be less than about 30 weight percent. However, in a particular polymer system, the actual limit will be dictated by the solubility of the various monomers in the diluent. In order to produce an optically clear copolymer, it is important that a phase separation leading to visual opacity does not occur between the comonomers and the diluent, or the diluent and the final copolymer.

Furthermore, the maximum amount of diluent which may be used will depend on the amount of swelling the diluent causes the final polymers. Excessive swelling will or may cause the copolymer to collapse when the diluent is replaced with water upon hydration. Suitable diluents include, but are not limited to, ethylene glycol; glycerine; liquid poly(ethylene glycol); alcohols; alcohol/water mixtures; ethylene oxide/propylene oxide block copolymers; low molecular weight linear poly(2-hydroxyethyl methacrylate); glycol esters of lactic acid; formamides; ketones; dialkylsulfoxides; butyl carbitol; boric acid esters of polyhydric alcohols such as boric acid esters of glycerol and the like and mixtures thereof.

If necessary, it may be desirable to remove residual diluent from the lens before edge-finishing operations which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. If desired, the mixture used to produce the hydrogel lens may further include crosslinking and wetting agents known in the prior art for making hydrogel materials.

In the case of intraocular lenses, the monomeric mixtures to be polymerized may further include a monomer for increasing the refractive index of the resultant polymerized product. Examples of such monomers include aromatic (meth) acrylates, such as phenyl (meth)acrylate, 2-phenylethyl (meth)acrylate, 2-phenoxyethyl methacrylate, and benzyl (meth)acrylate.

The ophthalmic devices such as contact lenses obtained herein may be subjected to optional machining operations. For example, the optional machining steps may include buffing or polishing a lens edge and/or surface. Generally, such machining processes may be performed before or after the product is released from a mold part, e.g., the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

The lens may then be transferred to individual lens packages containing a buffered saline solution. The saline solution may be added to the package either before or after transfer of the lens. Appropriate packaging designs and materials are known in the art. A plastic package is releasably sealed with a film. Suitable sealing films are known in the art and include foils, polymer films and mixtures thereof. The sealed packages containing the lenses are then sterilized to ensure a sterile product. Suitable sterilization means and conditions are known in the art and include, for example, autoclaving.

As one skilled in the art will readily appreciate other steps may be included in the molding and packaging process described above. Such other steps can include, for example, coating the formed lens, surface treating the lens during formation (e.g., via mold transfer), inspecting the lens, discarding defective lenses, cleaning the mold halves, reusing the mold halves, and the like and combinations thereof.

The following examples are provided to enable one skilled in the art to practice the invention and are merely illustrative. The examples should not be read as limiting the scope of the invention as defined in the claims.

Various polymerization products were formed as discussed below and characterized by standard testing procedures such as:

Water %: Two sets of six hydrated lenses or films are blotted dry on a piece of filter paper to remove excess water, and samples are weighed (wet weight). Samples are then placed in a microwave oven for 10 minutes inside a jar containing dessicant. The samples are then allowed to sit for 30 minutes to equilibrate to room temperature and reweighed (dry weight). The percent water is calculated from the wet and dry weights.

Contact Angle: Captive bubble contact angle data was collected on a First Ten Angstroms FTA-1000 prop Shape Instrument. All samples were rinsed in HPLC grade water prior to analysis in order to remove components of the packaging solution from the sample surface. Prior to data collection the surface tension of the water used for all experiments was measured using the pendant drop method. In order for the water to qualify as appropriate for use, a surface tension value of 70-72 dynes/cm was expected. All lens samples were placed onto a curved sample holder and submerged into a quartz cell filled with HPLC grade water. Advancing and receding captive bubble contact angles were collected for each sample. The advancing contact angle is defined as the angle measured in water as the air bubble is retracting from the lens surface (water is advancing across the surface). All captive bubble data was collected using a high speed digital camera focused onto the sample/air bubble interface. The contact angle was calculated at the digital frame just prior to contact line movement across the sample/air bubble interface. The receding contact angle is defined as the angle measured in water as the air bubble is expanding across the sample surface (water is receding from the surface).

Modulus ($g/mm^2$) and % elongation were measured per ASTM 1708 employing an Instron (Model 4502) instrument where the film sample was immersed in borate buffered saline; an appropriate size of the film sample was gauge length 22 mm and width 4.75 mm, where the sample further has ends forming a dogbone shape to accommodate gripping of the sample with clamps of the Instron instrument, and a thickness of 100±50 microns.

Tensile strength ($g/mm^2$) was measured per ASTM test method D1708a. [

Tear strength was measured according to ASTM D-1938 under the same physical conditions as for tensile modulus.

Sagittal depth (SAG) as measured on a Deltronic Comparator.

Refractive index (RI) was measured per typical methods on hydrated samples using a refractometer.

In the examples, the following abbreviations are used.

DMA: N,N-dimethylacrylamide
HEMA: 2-hydroxyethyl methacrylate
NVP: N-vinyl-2-pyrrolidone
AMA: Allyl methacrylate
EGDMA: Ethylene glycol dimethacrylate
Vazo™ 64: azo bis-isobutylnitrile (AIBN)
Irgacure 819 (photoinitiator): a compound having the structure:

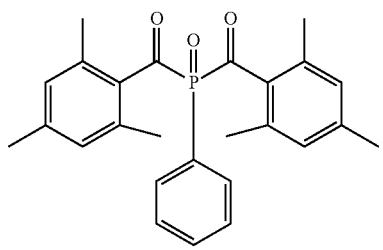

CIX-4: a compound having the structure:

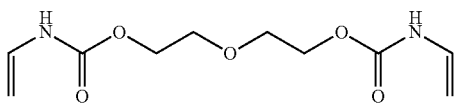 [SMILES: C=CNC(=O)OCCOCCOC(=O)NC=C]

SA monomer: a compound having the structure:

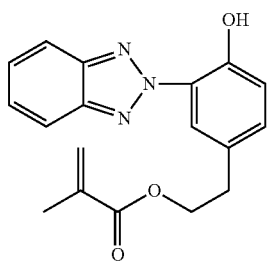 [SMILES: C=C(C)C(=O)OCCc1ccc(O)c(-n2nc3ccccc3n2)c1]

PDMA-C2-RAFT: a polymer having a number average molecular weight of 79.6 kDa and is of the following structure:

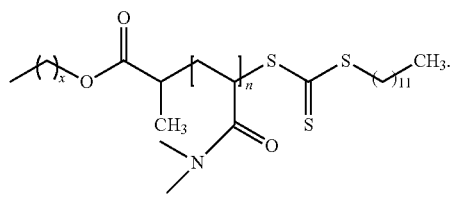

wherein x is 1 and n is 735.

PDMA-C12-RAFT: a polymer having a number average molecular weight of 62.6 kDa and is of the following structure:

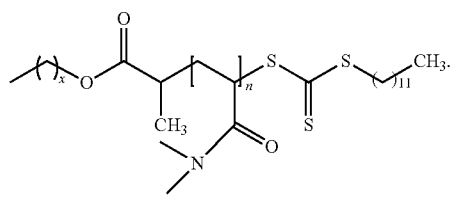

wherein x is 11 and n is 662.

PDMA-C18-RAFT: a polymer having a number average molecular weight of 65.4 kDa and is of the following structure:

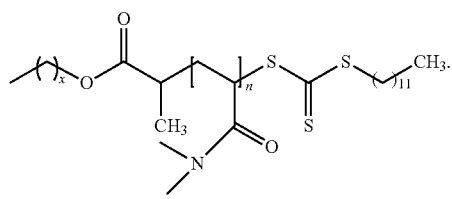

wherein x is 17 and n is 655.

PVP-RAFT: a polymer having a number average molecular weight of 53.1 kDa and is of the following structure:

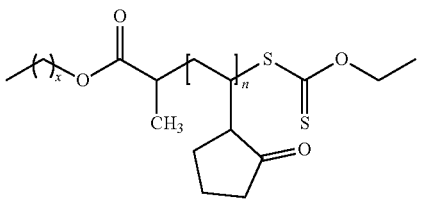

wherein x is 1 and n is 476.

PDMA-co-mPEGMA400: a polymer having a number average molecular weight of 60 kDa and is of the following structure:

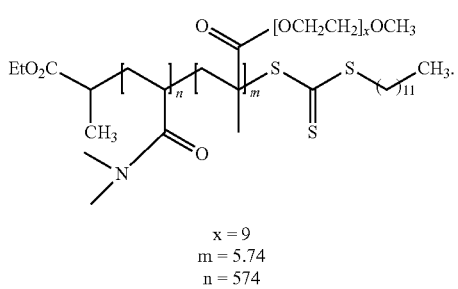

x = 9
m = 5.74
n = 574

Tetraethylene glycol dimethacrylate (TEGDMA): a compound of the following structure:

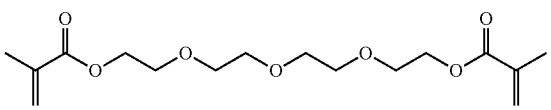

Trimethylolpropane trimethacrylate (TMPTMA): a compound of the following structure:

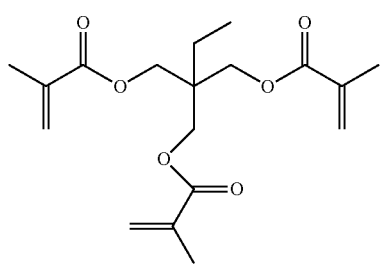

1,4-butanediol dimethacrylate (1,4-DBDDMA): a compound of the following structure:

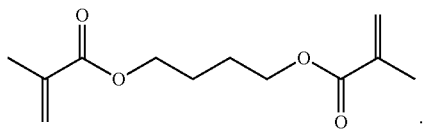 [SMILES: C=C(C)C(=O)OCCCCOC(=O)C(=C)C]

EXAMPLES 1-5

A monomer mix was made by mixing the following components, listed in Table 1 at amounts per weight.

TABLE 1

|  | Ex. 1 | Ex. 2 | Ex. 3 | Ex. 4 | Ex. 5 |
|---|---|---|---|---|---|
| Formulation | | | | | |
| HEMA | 57.67 | 57.67 | 57.67 | 57.67 | 57.67 |
| NVP | 27.66 | 27.66 | 27.66 | 27.66 | 27.66 |
| EGDMA | 0.10 | 0.22 | 0.50 | 0.75 | 1.00 |
| CIX-4 | 0.26 | 0.26 | 0.26 | 0.26 | 0.26 |
| Glycerol | 14.20 | 14.20 | 14.20 | 14.20 | 14.20 |
| AIBN | 0.50 | 0.50 | 0.50 | 0.50 | 0.50 |
| PDMA-RAFT-C12 | 8.58 | 8.58 | 8.58 | 8.58 | 8.58 |
| SA Monomer | 2.34 | 2.34 | 2.34 | 2.34 | 2.34 |
| Tint | 0.01 | 0.01 | 0.01 | 0.01 | 0.01 |
| Properties | | | | | |
| Modulus (g/mm$^2$) | 29 | 32 | 44 | 54 | 65 |
| Tensile Strength (g/mm$^2$) | 38 | 45 | 48 | 40 | 49 |
| % Elongation (%) | 223 | 211 | 157 | 98 | 97 |
| Water Content (%) | 59.87 | 59.06 | 57.41 | 55.82 | 55.82 |
| Contact Angle Adv. | 60 | 67 | 54 | 47 | 46 |
| Diameter (mm) | 14.42 | 14.36 | 14.16 | 14.03 | 13.92 |
| Sag (mm) | 3.93 | 3.89 | 3.84 | 3.67 | 3.74 |

The resultant monomeric mixture was cast into contact lenses by introducing the monomer mixture to a polypropylene mold assembly. Then, the mold assembly and monomer mixture were thermally cured for about 3.0 hours to form a contact lens. The resultant contact lenses were released from the mold assembly.

EXAMPLES 6-10

A monomer mix was made by mixing the following components, listed in Table 2 at amounts per weight.

TABLE 2

|  | Ex. 6 | Ex. 7 | Ex. 8 | Ex. 9 | Ex. 10 |
|---|---|---|---|---|---|
| Formulation | | | | | |
| HEMA | 57.67 | 57.67 | 57.67 | 57.67 | 57.67 |
| NVP | 27.66 | 27.66 | 27.66 | 27.66 | 27.66 |
| EGDMA | 0.10 | 0.22 | 0.50 | 0.75 | 1.00 |
| CIX-4 | 0.26 | 0.26 | 0.26 | 0.26 | 0.26 |
| Glycerol | 14.20 | 14.20 | 14.20 | 14.20 | 14.20 |
| AIBN | 0.50 | 0.50 | 0.50 | 0.50 | 0.50 |
| PDMA-RAFT-C18 | 8.58 | 8.58 | 8.58 | 8.58 | 8.58 |
| SA Monomer | 2.34 | 2.34 | 2.34 | 2.34 | 2.34 |
| Tint | 0.01 | 0.01 | 0.01 | 0.01 | 0.01 |
| Properties | | | | | |
| Modulus (g/mm$^2$) | 27 | 31 | 45 | 54 | 66 |
| Tensile Strength (g/mm$^2$) | 46 | 47 | 43 | 47 | 50 |
| % Elongation (%) | 266 | 226 | 136 | 116 | 99 |
| Water Content (%) | 58.66 | 57.81 | 56.03 | 54.42 | 53.46 |
| Contact Angle Adv. | 51 | 64 | 62 | 54 | 48 |
| Diameter (mm) | 14.47 | 14.36 | 14.14 | 14.06 | 13.94 |
| Sag (mm) | 3.93 | 3.89 | 3.83 | 3.79 | 3.76 |

The resultant monomeric mixture was cast into contact lenses by introducing the monomer mixture to a polypropylene mold assembly. Then, the mold assembly and monomer mixture were thermally cured for about 3.0 hours to form a contact lens. The resultant contact lenses were released from the mold assembly.

EXAMPLES 11-15

A monomer mix was made by mixing the following components, listed in Table 3 at amounts per weight.

TABLE 3

|  | Ex. 11 | Ex. 12 | Ex. 13 | Ex. 14 | Ex. 15 |
|---|---|---|---|---|---|
| Formulation | | | | | |
| HEMA | 57.67 | 57.67 | 57.67 | 57.67 | 57.67 |
| NVP | 27.66 | 27.66 | 27.66 | 27.66 | 27.66 |
| EGDMA | 0.10 | 0.22 | 0.50 | 0.75 | 1.00 |
| CIX-4 | 0.26 | 0.26 | 0.26 | 0.26 | 0.26 |
| Glycerol | 14.20 | 14.20 | 14.20 | 14.20 | 14.20 |
| AIBN | 0.50 | 0.50 | 0.50 | 0.50 | 0.50 |
| PDMA-RAFT | 8.58 | 8.58 | 8.58 | 8.58 | 8.58 |
| SA Monomer | 2.34 | 2.34 | 2.34 | 2.34 | 2.34 |
| Tint | 0.01 | 0.01 | 0.01 | 0.01 | 0.01 |
| Properties | | | | | |
| Modulus (g/mm$^2$) | 26 | 31 | 43 | 58 | 67 |
| Tensile Strength (g/mm$^2$) | 65 | 64 | 29 | 62 | 63 |
| % Elongation (%) | 331 | 280 | 88 | 73 | 108 |
| Water Content (%) | 59.93 | 59.29 | 57.47 | 56.25 | 55.14 |
| Contact Angle Adv. | 46 | 55 | 40 | 37 | 36 |
| Diameter (mm) | 14.26 | 14.38 | 14.19 | 14.09 | 13.98 |
| Sag (mm) | 3.91 | 3.91 | 3.86 | 3.80 | 3.76 |

The resultant monomeric mixture was cast into contact lenses by introducing the monomer mixture to a polypropylene mold assembly. Then, the mold assembly and monomer mixture were thermally cured for about 3.0 hours to form a contact lens. The resultant contact lenses were released from the mold assembly.

EXAMPLES 16-19

A monomer mix was made by mixing the following components, listed in Table 4 at amounts per weight.

TABLE 4

|  | Ex. 16 | Ex. 17 | Ex. 18 | Ex. 19 |
|---|---|---|---|---|
| Formulation | | | | |
| HEMA | 57.67 | 57.67 | 57.67 | 57.67 |
| NVP | 27.66 | 27.66 | 27.66 | 27.66 |
| EGDMA | 0.22 | 0.50 | 0.75 | 1.00 |
| CIX-4 | 0.26 | 0.26 | 0.26 | 0.26 |
| Glycerol | 14.20 | 14.20 | 14.20 | 14.20 |
| AIBN | 0.50 | 0.50 | 0.50 | 0.50 |
| PVP-RAFT | 8.58 | 8.58 | 8.58 | 8.58 |
| SA Monomer | 2.34 | 2.34 | 2.34 | 2.34 |
| Tint | 0.01 | 0.01 | 0.01 | 0.01 |
| Properties | | | | |
| Modulus (g/mm$^2$) | 30 | 42 | 51 | 63 |
| Tensile Strength (g/mm$^2$) | 43 | 49 | 45 | 50 |
| % Elongation (%) | 234 | 175 | 128 | 107 |
| Water Content (%) | 57.15 | 55.88 | 54.24 | 53.51 |
| Contact Angle Adv. | 41 | 47 | 52 | 49 |
| Diameter (mm) | 13.74 | 13.68 | 13.64 | 13.51 |
| Sag (mm) | 3.71) | 3.63 | 3.61 | 3.59 |

The resultant monomeric mixture was cast into contact lenses by introducing the monomer mixture to a polypropylene mold assembly. Then, the mold assembly and monomer mixture were thermally cured for about 3.0 hours to form a contact lens. The resultant contact lenses were released from the mold assembly.

EXAMPLES 20-24

A monomer mix was made by mixing the following components, listed in Table 5 at amounts per weight.

TABLE 5

|  | Ex. 20 | Ex. 21 | Ex. 22 | Ex. 23 | Ex. 24 |
|---|---|---|---|---|---|
| Formulation | | | | | |
| HEMA | 57.67 | 57.67 | 57.67 | 57.67 | 57.67 |
| NVP | 27.66 | 27.66 | 27.66 | 27.66 | 27.66 |
| TEGDMA | 0.17 | 0.37 | 0.83 | 1.25 | 1.67 |
| CIX-4 | 0.26 | 0.26 | 0.26 | 0.26 | 0.26 |
| Glycerol | 14.20 | 14.20 | 14.20 | 14.20 | 14.20 |
| AIBN | 0.50 | 0.50 | 0.50 | 0.50 | 0.50 |
| PDMA-co-mPEG400MA | 8.58 | 8.58 | 8.58 | 8.58 | 8.58 |
| SA Monomer | 2.34 | 2.34 | 2.34 | 2.34 | 2.34 |
| Tint | 0.01 | 0.01 | 0.01 | 0.01 | 0.01 |
| Properties | | | | | |
| Modulus (g/mm$^2$) | 25 | 30 | 43 | 52 | 60 |
| Tensile Strength (g/mm$^2$) | 50 | 39 | 41 | 50 | 40 |
| % Elongation (%) | 315 | 211 | 143 | 139 | 88 |
| Water Content (%) | 59.23 | 58.56 | 57.1 | 55.88 | 55.19 |
| Contact Angle Adv. | 50 | 55 | 43 | 39 | 36 |
| Diameter (mm) | 14.48 | 14.44 | 14.25 | 14.09 | 13.97 |
| Sag (mm) | 3.96 | 3.92 | 3.86 | 3.83 | 3.80 |

The resultant monomeric mixture was cast into contact lenses by introducing the monomer mixture to a polypropylene mold assembly. Then, the mold assembly and monomer mixture were thermally cured for about 3.0 hours to form a contact lens. The resultant contact lenses were released from the mold assembly.

EXAMPLES 25-29

A monomer mix was made by mixing the following components, listed in Table 6 at amounts per weight.

TABLE 6

|  | Ex. 25 | Ex. 26 | Ex. 27 | Ex. 28 | Ex. 29 |
|---|---|---|---|---|---|
| Formulation | | | | | |
| HEMA | 57.67 | 57.67 | 57.67 | 57.67 | 57.67 |
| NVP | 27.66 | 27.66 | 27.66 | 27.66 | 27.66 |
| TMPTMA | 0.17 | 0.38 | 0.85 | 1.305 | 1.7 |
| CIX-4 | 0.26 | 0.26 | 0.26 | 0.26 | 0.26 |
| Glycerol | 14.20 | 14.20 | 14.20 | 14.20 | 14.20 |
| AIBN | 0.50 | 0.50 | 0.50 | 0.50 | 0.50 |
| PDMA-co-mPEG400MA | 8.58 | 8.58 | 8.58 | 8.58 | 8.58 |
| SA Monomer | 2.34 | 2.34 | 2.34 | 2.34 | 2.34 |
| Tint | 0.01 | 0.01 | 0.01 | 0.01 | 0.01 |
| Properties | | | | | |
| Modulus (g/mm$^2$) | 35 | 41 | 56 | 76 | 84 |
| Tensile Strength (g/mm$^2$) | 42 | 46 | 42 | 46 | 54 |
| % Elongation (%) | 188 | 155 | 97 | 75 | 76 |
| Water Content (%) | 58.20 | 56.73 | 55.23 | 54.15 | 53.14 |
| Contact Angle Adv. | 49 | 41 | 38 | 38 | 38 |
| Diameter (mm) | 13.97 | 13.90 | 13.74 | 13.68 | 13.53 |
| Sag (mm) | 3.77 | 3.74 | 3.69 | 3.64 | 3.63 |

The resultant monomeric mixture was cast into contact lenses by introducing the monomer mixture to a polypropylene mold assembly. Then, the mold assembly and monomer mixture were thermally cured for about 3.0 hours to form a contact lens. The resultant contact lenses were released from the mold assembly.

EXAMPLES 30-34

A monomer mix was made by mixing the following components, listed in Table 7 at amounts per weight.

TABLE 7

|  | Ex. 30 | Ex. 31 | Ex. 32 | Ex. 33 | Ex. 34 |
|---|---|---|---|---|---|
| Formulation | | | | | |
| HEMA | 57.67 | 57.67 | 57.67 | 57.67 | 57.67 |
| NVP | 27.66 | 27.66 | 27.66 | 27.66 | 27.66 |
| 1,4-butanediol dimethacrylate | 0.11 | 0.25 | 0.57 | 0.86 | 1.14 |
| CIX-4 | 0.26 | 0.26 | 0.26 | 0.26 | 0.26 |
| Glycerol | 14.20 | 14.20 | 14.20 | 14.20 | 14.20 |
| AIBN | 0.50 | 0.50 | 0.50 | 0.50 | 0.50 |
| PDMA-co-mPEG400MA | 8.58 | 8.58 | 8.58 | 8.58 | 8.58 |
| SA Monomer | 2.34 | 2.34 | 2.34 | 2.34 | 2.34 |
| Tint | 0.01 | 0.01 | 0.01 | 0.01 | 0.01 |
| Properties | | | | | |
| Modulus (g/mm$^2$) | 37 | 41 | 52 | 61 | 72 |
| Tensile Strength (g/mm$^2$) | 44 | 49 | 38 | 46 | 43 |
| % Elongation (%) | 190 | 178 | 101 | 99 | 78 |
| Water Content (%) | 58.43 | 57.09 | 56.56 | 55.16 | 54.19 |
| Contact Angle Adv. | 49 | 43 | 39 | 38 | 38 |
| Diameter (mm) | 14.07 | 13.956 | 13.81 | 13.74 | 13.63 |
| Sag (mm) | 3.82 | 3.80 | 3.76 | 3.71 | 3.70 |

The resultant monomeric mixture was cast into contact lenses by introducing the monomer mixture to a polypropylene mold assembly. Then, the mold assembly and monomer mixture were thermally cured for about 3.0 hours to form a contact lens. The resultant contact lenses were released from the mold assembly.

EXAMPLES 35-40

A monomer mix was made by mixing the following components, listed in Table 8 at amounts per weight.

TABLE 8

| Formulation | Ex. 35 | Ex. 36 | Ex. 37 | Ex. 38 | Ex. 39 | Ex. 40 |
|---|---|---|---|---|---|---|
| HEMA | 57.67 | 57.67 | 57.67 | 57.67 | 57.67 | 57.67 |
| NVP | 27.66 | 27.66 | 27.66 | 27.66 | 27.66 | 27.66 |
| EGDMA | 0.50 | 0.50 | 0.50 | 0.50 | 0.50 | 0.50 |
| CIX-4 | 0.26 | 0.26 | 0.26 | 0.26 | 0.26 | 0.26 |
| Glycerol | 14.20 | 14.20 | 14.20 | 14.20 | 14.20 | 14.20 |
| AIBN | 0.50 | 0.50 | 0.50 | 0.50 | 0.50 | 0.50 |
| PDMA-co-mPEGMA400 | 8.58 | 5 | 3.5 | 2 | 1 | 0.5 |
| SA Monomer | 2.34 | 2.34 | 2.34 | 2.34 | 2.34 | 2.34 |
| Tint | 0.01 | 0.01 | 0.01 | 0.01 | 0.01 | 0.01 |
| Properties | | | | | | |
| Modulus (g/mm$^2$) | 43 | 43 | 44 | 49 | 48 | 50 |
| Tensile Strength (g/mm$^2$) | 48 | 37 | 59 | 70 | 75 | 65 |
| % Elongation (%) | 161 | 123 | 173 | 188 | 196 | 175 |
| Water Content (%) | 57.04 | 55.40 | 54.80 | 53.88 | 53.16 | 52.78 |
| Contact Angle Adv. | 43 | 49 | 56 | 61 | 68 | 69 |

The resultant monomeric mixture was cast into contact lenses by introducing the monomer mixture to a polypropylene mold assembly. Then, the mold assembly and monomer mixture were thermally cured for about 3.0 hours to form a contact lens. The resultant contact lenses were released from the mold assembly.

EXAMPLES 41-47

A monomer mix was made by mixing the following components, listed in Table 9 at amounts per weight.

TABLE 9

| Formulation | Ex. 41 | Ex. 42 | Ex. 43 | Ex. 44 | Ex. 46 | Ex. 47 |
|---|---|---|---|---|---|---|
| HEMA | 57.67 | 57.67 | 57.67 | 57.67 | 57.67 | 57.67 |
| NVP | 27.66 | 27.66 | 27.66 | 27.66 | 27.66 | 27.66 |
| EGDMA | 0.75 | 0.75 | 0.75 | 0.75 | 0.75 | 0.75 |
| CIX-4 | 0.26 | 0.26 | 0.26 | 0.26 | 0.26 | 0.26 |
| Glycerol | 14.20 | 14.20 | 14.20 | 14.20 | 14.20 | 14.20 |
| AIBN | 0.50 | 0.50 | 0.50 | 0.50 | 0.50 | 0.50 |
| PDMA-co-mPEGMA400 | 5.00 | 3.50 | 2.00 | 1.00 | 0.50 | 8.58 |
| SA Monomer | 2.34 | 2.34 | 2.34 | 2.34 | 2.34 | 2.34 |
| Tint | 0.01 | 0.01 | 0.01 | 0.01 | 0.01 | 0.01 |
| Properties |  |  |  |  |  |  |
| Modulus (g/mm$^2$) | 53 | 56 | 57 | 52 | 60 | 49 |
| Tensile Strength (g/mm$^2$) | 29 | 47 | 52 | 37 | 51 | 43 |
| % Elongation (%) | 64 | 99 | 111 | 80 | 106 | 113 |
| Water Content (%) | 54.31 | 53.37 | 52.24 | 51.64 | 51.89 | 55.73 |
| Contact Angle Adv. | 42 | 56 | 63 | 68 | 69 | 39 |

The resultant monomeric mixture was cast into contact lenses by introducing the monomer mixture to a polypropylene mold assembly. Then, the mold assembly and monomer mixture were thermally cured for about 3.0 hours to form a contact lens. The resultant contact lenses were released from the mold assembly

EXAMPLES 48-53

A monomer mix was made by mixing the following components, listed in Table 10 at amounts per weight.

TABLE 10

| Formulation | Ex. 48 | Ex. 49 | Ex. 50 | Ex. 51 | Ex. 52 | Ex. 53 |
|---|---|---|---|---|---|---|
| HEMA | 57.67 | 57.67 | 57.67 | 57.67 | 57.67 | 57.67 |
| NVP | 27.66 | 27.66 | 27.66 | 27.66 | 27.66 | 27.66 |
| EGDMA | 1.00 | 1.00 | 1.00 | 1.00 | 1.00 | 1.00 |
| CIX-4 | 0.26 | 0.26 | 0.26 | 0.26 | 0.26 | 0.26 |
| Glycerol | 14.20 | 14.20 | 14.20 | 14.20 | 14.20 | 14.20 |
| AIBN | 0.50 | 0.50 | 0.50 | 0.50 | 0.50 | 0.50 |
| PDMA-co-mPEG400MA | 5.00 | 3.50 | 2.00 | 1.00 | 0.50 | 8.58 |
| SA Monomer | 2.34 | 2.34 | 2.34 | 2.34 | 2.34 | 2.34 |
| Tint | 0.01 | 0.01 | 0.01 | 0.01 | 0.01 | 0.01 |
| Properties |  |  |  |  |  |  |
| Modulus (g/mm$^2$) | 63 | 53 | 69 | 71 | 74 | 74 |
| Tensile Strength (g/mm$^2$) | 46 | 24 | 45 | 53 | 42 | 49 |
| % Elongation (%) | 96 | 75 | 88 | 100 | 74 | 87 |
| Water Content (%) | 55.63 | 54.27 | 52.93 | 51.80 | 51.13 | 50.73 |
| Contact Angle Adv. | 38 | 41 | 39 | 51 | 45 | 43 |

The resultant monomeric mixture was cast into contact lenses by introducing the monomer mixture to a polypropylene mold assembly. Then, the mold assembly and monomer mixture were thermally cured for about 3.0 hours to form a contact lens. The resultant contact lenses were released from the mold assembly.

EXAMPLES 54-58

A monomer mix was made by mixing the following components, listed in Table 11 at amounts per weight.

TABLE 11

|  | Ex. 54 | Ex. 55 | Ex. 56 | Ex. 57 | Ex. 58 |
|---|---|---|---|---|---|
| Formulation |  |  |  |  |  |
| HEMA | 57.67 | 57.67 | 57.67 | 57.67 | 57.67 |
| NVP | 27.66 | 27.66 | 27.66 | 27.66 | 27.66 |
| EGDMA | 0.10 | 0.22 | 0.50 | 0.75 | 1.00 |
| AMA | 0.15 | 0.15 | 0.15 | 0.15 | 0.15 |
| Glycerol | 14.20 | 14.20 | 14.20 | 14.20 | 14.20 |
| AIBN | 0.50 | 0.50 | 0.50 | 0.50 | 0.50 |
| PDMA-co-mPEG400MA | 8.58 | 8.58 | 8.58 | 8.58 | 8.58 |
| SA Monomer | 2.34 | 2.34 | 2.34 | 2.34 | 2.34 |
| Tint | 0.01 | 0.01 | 0.01 | 0.01 | 0.01 |
| Properties |  |  |  |  |  |
| Modulus (g/mm$^2$) | 34 | 38 | 48 | 57 | 67 |
| Tensile Strength (g/mm$^2$) | 40 | 46 | 38 | 47 | 41 |
| % Elongation (%) | 196 | 190 | 113 | 109 | 80 |
| Water Content (%) | 59.13 | 58.2 | 56.98 | 55.65 | 54.44 |
| Contact Angle Adv. | 48 | 42 | 37 | 37 | 37 |

The resultant monomeric mixture was cast into contact lenses by introducing the monomer mixture to a polypropylene mold assembly. Then, the mold assembly and monomer mixture were thermally cured for about 3.0 hours to form a contact lens. The resultant contact lenses were released from the mold assembly.

EXAMPLES 59-64

A monomer mix was made by mixing the following components, listed in Table 12 at amounts per weight.

TABLE 12

|  | Ex. 59 | Ex. 60 | Ex. 61 | Ex. 62 | Ex. 63 |
|---|---|---|---|---|---|
| Formulation |  |  |  |  |  |
| HEMA | 57.67 | 57.67 | 57.67 | 57.67 | 57.67 |
| NVP | 27.66 | 27.66 | 27.66 | 27.66 | 27.66 |
| EGDMA | 0.10 | 0.22 | 0.50 | 0.75 | 1.00 |
| CIX-4 | 0.26 | 0.26 | 0.26 | 0.26 | 0.26 |
| Glycerol | 14.20 | 14.20 | 14.20 | 14.20 | 14.20 |
| Irgacure 819 | 0.76 | 0.76 | 0.76 | 0.76 | 0.76 |
| PDMA-co-mPEG400MA | 8.58 | 8.58 | 8.58 | 8.58 | 8.58 |
| SA Monomer | 2.34 | 2.34 | 2.34 | 2.34 | 2.34 |
| Tint | 0.01 | 0.01 | 0.01 | 0.01 | 0.01 |

TABLE 12-continued

|  | Ex. 59 | Ex. 60 | Ex. 61 | Ex. 62 | Ex. 63 |
| --- | --- | --- | --- | --- | --- |
| Properties |  |  |  |  |  |
| Modulus (g/mm$^2$) | Lenses Hazy | Lenses Hazy | 19 | 28 | 39 |
| Tensile Strength (g/mm$^2$) |  |  | 28 | 34 | 36 |
| % Elongation (%) |  |  | 213 | 160 | 124 |
| Water Content (%) |  |  | 59.55 | 57.04 | 55.32 |
| Contact Angle Adv. |  |  | 36 | 41 | 45 |
| Diameter (mm) |  |  | 13.85 | 13.60 | 13.46 |
| Sag (mm) |  |  | 3.71 | 3.67 | 3.63 |

The resultant monomeric mixture was cast into contact lenses by introducing the monomer mixture to a polypropylene mold assembly. Then, the mold assembly and monomer mixture were blue light cured for about 25 minutes at 5 mW/cm$^2$ to form a contact lens. The resultant contact lenses were released from the mold assembly. As shown in Table 12, when using blue light to cure the monomer mixture, additional EGDMA was necessary to form the lens.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. An ophthalmic device which is a polymerization product of a monomeric mixture comprising: (a) a major amount of one or more non-silicone-containing hydrophilic monomers, wherein the major amount of the one or more non-silicone-containing hydrophilic monomers present in the monomeric mixture is an amount greater than 50 weight percent, based on the total weight of the monomeric mixture; (b) a crosslinking agent mixture comprising (i) one or more first crosslinking agents containing at least two ethylenically unsaturated reactive end groups, wherein the at least two ethylenically unsaturated reactive end groups are (meth)acrylate-containing reactive end groups and (ii) one or more second crosslinking agents containing at least two ethylenically unsaturated reactive end groups wherein at least one of the ethylenically unsaturated reactive end groups is a non-(meth)acrylate reactive end group; and (c) one or more hydrophilic polymers or copolymers comprising one or more hydrophilic units and a thio carbonyl thio fragment of a reversible addition fragmentation chain transfer ("RAFT") agent, wherein the ophthalmic device has an equilibrium water content of at least about 45 weight percent.

2. The ophthalmic device of claim 1, wherein the one or more non-silicone-containing hydrophilic monomers is selected from the group consisting of an amide, cyclic lactam, hydroxyl-containing (meth)acrylate, poly(alkene glycols) functionalized with polymerizable groups and mixtures thereof.

3. The ophthalmic device of claim 2, wherein the amide is selected from the group consisting of N,N-dimethyl acrylamide, N,N-dimethylmethacrylamide and mixtures thereof.

4. The ophthalmic device of claim 2, wherein the cyclic lactam is selected from the group consisting of N-vinyl-2-pyrrolidone, N-vinyl caprolactam, N-vinyl-2-piperidone and mixtures thereof.

5. The ophthalmic device of claim 1, wherein the one or more non-silicone-containing hydrophilic monomers is selected from the group consisting of N,N-dimethylacrylamide, N,N-dimethylmethacrylamide, N-vinyl-2-pyrrolidone, N-vinyl caprolactam, N-vinyl-2-piperidone, 2-hydroxyethyl methacrylate, N-(2-hydroxyethyl)methacrylamide, glyceryl methacrylate, N-methacryloyl glycine, (2-hydroxy-3-methacryloylpropyl)-4-methoxy phenylether and mixtures thereof.

6. The ophthalmic device of claim 1, wherein the one or more first crosslinking agents are selected from the group consisting of an alkylene glycol-containing di(meth)acrylate crosslinking agent, an alkylene glycol-containing tri(meth) acrylate crosslinking agent, an alkylene glycol-containing tertra(meth)acrylate crosslinking agent and mixtures thereof.

7. The ophthalmic device of claim 6, wherein the alkylene glycol di(meth)acrylate crosslinking agent is an ethylene glycol di(meth)acrylate having up to 10 ethylene glycol units.

8. The ophthalmic device of claim 1, wherein the one or more second crosslinking agents are selected from the group consisting of a di(N-vinylcarbamate)-containing crosslinking agent, a di(N-allylcarbamate)-containing crosslinking agent, a di(O-vinylcarbamate)-containing crosslinking agent, a di(O-allylcarbamate)-containing crosslinking agent, a di(O-vinyl carbonate)-containing crosslinking agent, a di(O-allylcarbonate)-containing crosslinking agent, a tri(N-vinylcarbamate)-containing crosslinking agent, a tri(N-allyl carbamate)-containing crosslinking agent, a tri(O-vinylcarbamate)-containing crosslinking agent, a tri(O-allylcarbamate)-containing crosslinking agent, a tri(O-vinylcarbonate)-containing crosslinking agent, a tri(O-allylcarbonate)-containing crosslinking agent, a tetra(N-vinyl carbamate)-containing crosslinking agent, a tetra (N-allylcarbamate)-containing crosslinking agent, a tetra(O-vinylcarbamate)-containing crosslinking agent, a tetra(O-allylcarbamate)-containing crosslinking agent, a tetra(O-vinylcarbonate)-containing crosslinking agent, a tetra(O-allyl carbonate)-containing crosslinking agent, isocyanurate-containing crosslinking agent and mixtures thereof.

9. The ophthalmic device of claim 1, wherein the one or more second crosslinking agents are selected from the group consisting of diethylene glycol bis(N-vinylcarbamate), diethylene glycol bis(N-allylcarbamate), diethylene glycol bis(O-vinylcarbamate), diethylene glycol bis(O-allylcarbamate), 1,4-butanediol bis(N-vinylcarbamate), ethylene glycol bis(O-vinyl carbonate), diethylene glycol bis(O-vinyl carbonate), 1,4-butanediol bis(O-vinyl carbonate), allyl methacrylate and mixtures thereof.

10. The ophthalmic device of claim 1, wherein one or more first crosslinking agents are present in the monomeric mixture in an amount of about 0.1 to about 2.0 weight percent, based on the total weight of the monomeric mixture, and the one or more second crosslinking agents are present in the monomer monomeric mixture in an amount of about 0.05 to about 2.0 weight percent, based on the total weight of the monomeric mixture.

11. The ophthalmic device of claim 1, wherein the thio carbonyl thio fragment of the hydrophilic polymer or copolymer is of a RAFT agent comprising a dithioester group, xanthate group, dithiocarbamate group or trithiocarbonate group.

12. The ophthalmic device of claim 1, wherein the one or more hydrophilic units of the one or more hydrophilic polymers or copolymers are derived from one or more hydrophilic monomers selected from the group consisting of an unsaturated carboxylic acid, acrylamide, cyclic lactam, poly(alkyleneoxy)(meth)acrylate, (meth)acrylic acid, hydroxyl-containing-(meth)acrylate, hydrophilic vinyl carbonate, hydrophilic vinyl carbamate monomer, hydrophilic oxazolone monomer, and mixtures thereof.

13. The ophthalmic device of claim 1, wherein the one or more hydrophilic polymers or copolymers have a number average molecular weight of at least about 30 kilo Daltons (kDa).

14. The ophthalmic device of claim 1, wherein the one or more hydrophilic polymers or copolymers have a number average molecular weight of at least about 45 kDa.

15. The ophthalmic device of claim 1, wherein the one or more hydrophilic polymers or copolymers have a number average molecular weight of at least about 60 kDa.

16. The ophthalmic device of claim 1, wherein the one or more hydrophilic polymers or copolymers further comprise units derived from an ethylenically unsaturated polymerizable alkoxylated polymer selected from the group consisting of polyethylene glycol (PEG)-200 methacrylate, PEG-400 methacrylate, PEG-600 methacrylate, PEG-1000 methacrylate and mixtures thereof.

17. The ophthalmic device of claim 1, wherein the monomeric mixture further comprises an ultraviolet (UV) blocker.

18. The ophthalmic device of claim 1, having a captive bubble contact angle of from about 30° to about 70°.

19. The ophthalmic device of claim 1, wherein the ophthalmic device is a contact lens.

20. The ophthalmic device of claim 1, wherein the ophthalmic device is a hydrogel.

21. The ophthalmic device of claim 1, wherein the monomeric mixture contains no silicone-containing monomer.

22. A method of making an ophthalmic device comprising
(a) providing a monomeric mixture comprising (i) a major amount of one or more non-silicone-containing hydrophilic monomers, wherein the major amount of the one or more non-silicone-containing hydrophilic monomers present in the monomeric mixture is an amount greater than 50 weight percent, based on the total weight of the monomeric mixture; (ii) a crosslinking agent mixture comprising (1) one or more first crosslinking agents containing at least two ethylenically unsaturated reactive end groups, wherein the at least two ethylenically unsaturated reactive end groups are (meth)acrylate-containing reactive end groups and (2) one or more second crosslinking agents containing at least two ethylenically unsaturated reactive end groups wherein at least one of the reactive end groups is a non-(meth)acrylate reactive end group; and (iii) one or more hydrophilic polymers or copolymers comprising one or more hydrophilic units and a thio carbonyl thio fragment of a RAFT agent;
(b) subjecting the monomeric mixture to polymerizing conditions to provide a polymerized device, and
(c) hydrating the polymerized device, wherein the ophthalmic device has an equilibrium water content of at least about 45 weight percent.

23. The method of claim 22, wherein the monomeric mixture comprises about 0.1 to about 2.0 weight percent, based on the total weight of the monomeric mixture of the one or more first crosslinking agents and about 0.05 to about 2.0 weight percent, based on the total weight of the monomeric mixture, of the one or more second crosslinking agents.

* * * * *